April 3, 1956 — E. DE GONIA — 2,740,349
UTENSIL FOR FRYING TACO SHELLS
Filed July 2, 1951 — 2 Sheets-Sheet 1

INVENTOR.
Edward DeGonia
BY
Stedman B Hoar
Agent

April 3, 1956  E. DE GONIA  2,740,349
UTENSIL FOR FRYING TACO SHELLS
Filed July 2, 1951  2 Sheets-Sheet 2

INVENTOR.
Edward De Gonia
BY Stedman B. Hoar
Agent

United States Patent Office 2,740,349
Patented Apr. 3, 1956

2,740,349

UTENSIL FOR FRYING TACO SHELLS

Edward De Gonia, Santa Ana, Calif.

Application July 2, 1951, Serial No. 234,697

3 Claims. (Cl. 99—426)

This invention relates generally to cooking utensils and more particularly relates to a utensil for frying the outer coverings or shells of the sandwich-type comestibles known as tacos. While the principal object of the invention is to provide a utensil in which a plurality of taco shells may be simultaneously fried with uniformity as to shape and crispness, usage of the utensil is not confined to this one purpose, as the utensil has been so designed that as a unit or in its several parts it may be applied as a handy instrument to several kitchen uses.

The taco, as is well known to persons who appreciate Mexican foods, comprises a shell of corn dough, called a tortilla, bent to a narrow U-shape in cross-section and fried to crispness, and stuffed with various chopped meats, spices and chopped lettuce. Before frying, the tortilla has the form and consistency of a very thin pancake, being circular or prolate, and flabby. The time-honored method of frying the shell is to grasp opposite edges with tongs, hold the two grasped portions about an inch apart, allowing the central portion to fall in a catenary between them, and to dip and hold the so-bent tortilla in hot fat until it is fried to requisite crispness. The degree of crispness may vary, there being such articles as "soft-shelled" tacos, but the usual degree is about equivalent to that of potato chips, so that the shell will hold its shape and its contents.

The above-described method not only is slow, limiting production to one manually formed shell at a time, but it subjects the cook to heat and the sputtering of hot fat. It involves great difficulty in forming the shell with substantially parallel sides, because the catenary only approximates the desirable parallel form. Parallelism is highly desirable because if the sides are convergent at their outer edges, it is difficult to stuff the shell with its contents; if the sides are divergent, it is difficult to retain the contents. Even a skilled taco cook will spoil many shells in the making, breaking them by trying to bend them to better shape after they have become crisp, or overcooking or undercooking them because his attention is fixed upon obtaining the proper form.

It is accordingly a further object of my invention to provide a taco shell fryer which will eliminate much of the manual operation and exercise of judgment now required on the part of a taco cook.

Another object of the invention is to provide a taco shell fryer which will fry shells with parallel sides.

Still another object of the invention is to provide a taco shell fryer so constructed as to admit heat uniformly to the shell, so that the latter is uniformly fried and is not crisp in one spot and flabby in another.

A further important object of the invention is to provide a taco shell fryer which directs and controls the escape of steam bubbles from the tortilla so that the cook is not subjected to the sputtering of hot oil and the oil is preserved for longer use.

Broadly stated, I attain the aforesaid objects by providing a fry-basket divided into compartments individually suitable for holding molding cores upon which the taco shells may be formed and cooked. Both the partitions between compartments and the cores have a multiplicity of openings to permit the circulation of heat and the escape of moisture in the form of steam from the shells. The cores may be individually lifted from the respective compartments, and the partition structure may be removable as a unit, together with contained cores, from the basket or may be integral with the basket. The advantage of the first-mentioned construction is that the basket then becomes available for other uses, such as French-frying potatoes.

Other useful advantages of the invention will be pointed out as the following description of preferred and modified embodiments of the invention proceeds, or will be apparent from the description in the light of the accompanying drawing, in which.

Figure 1:
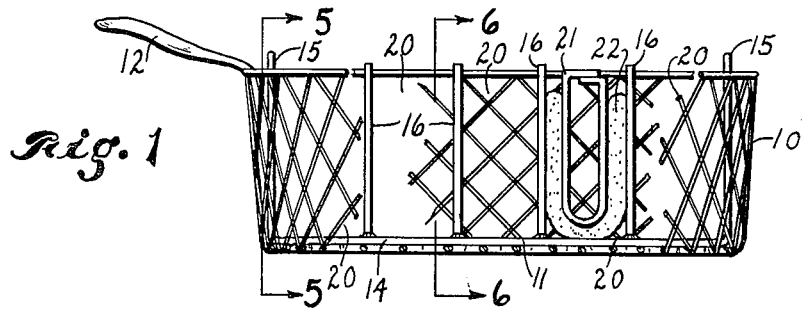
Fig. 1 is a side elevational view of a taco shell fryer according to my invention, the basket being shown broken away to reveal the contents.
Figure 7:
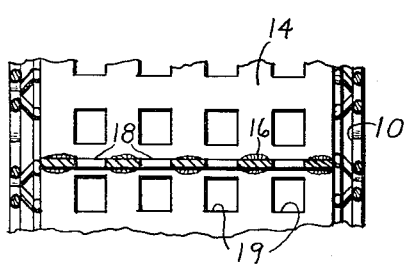
Fig. 7 is a horizontal sectional view on the line of Section 7—7 of Fig. 6, showing a fragment of the base of the mold frame.
Figure 5:
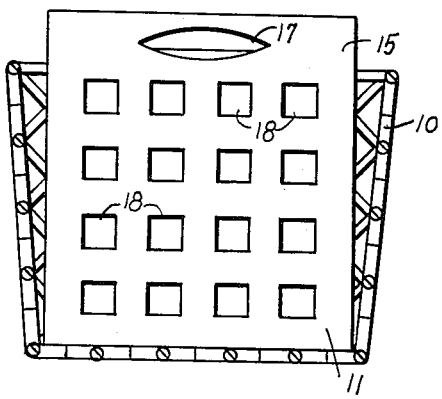
Fig. 5 is a vertical cross-sectional view, on an enlarged scale, on the line of Section 5—5 of Fig. 1, showing one end of a mold frame insertable in a fry basket and separable therefrom.
Figure 6:
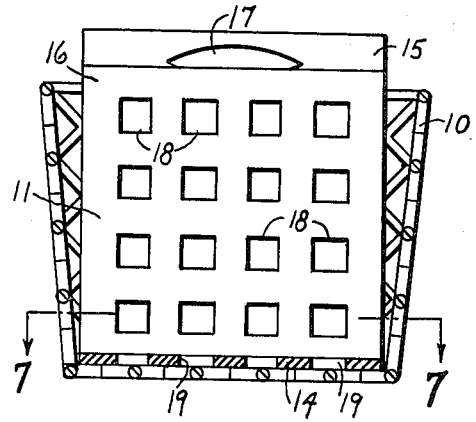
Fig. 6 is a vertical cross-sectional view, similar to Fig. 5, on the line of Section 6—6 of Fig. 1, showing an interior partition of the frame.

Having reference now to the details of the drawings, I have shown in Fig. 1 a fry-basket 10 which holds a frame 11. It will be understood that the basket 10 is to be placed in and removed from a suitable pot, not shown, which will contain hot fat or oil. A handle 12 is provided on the basket 10 for this purpose. The frame 11 comprises a base 14, end partitions 15, and intermediate partitions 16, and is insertable in and removable from the basket 10, holes 17 being provided in the end partitions 15 for receiving a lifting implement. As shown in Figs. 5, 6, and 7, both the end partitions 15 and intermediate partitions 16 have holes 18, and the base 14 has holes 19, these holes 18 and 19 being of such number and area as to convert the partitions and base into grills through which the cooking oil may freely circulate. The partitions 15 and 16 are secured to the base 14 as by welding and are spaced to form compartments or channels 20, each designed to hold a mold core 21 and tortilla 22.

Figure 2:
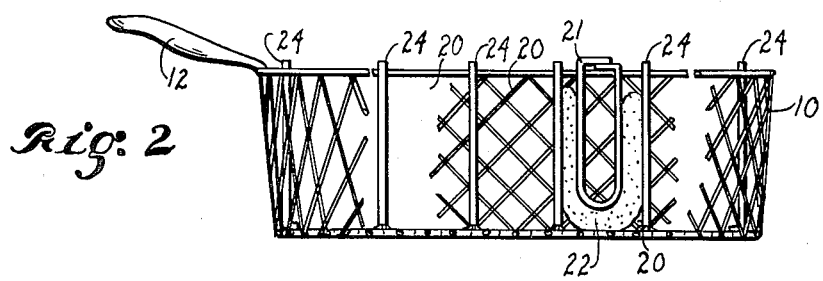
Fig. 2 is a similar side elevational view of a modified form of my taco shell fryer.

The basket 10 of Fig. 2 is the same as shown in Fig. 1, but the frame forming the compartments or channels 20 differs from the frame 11 in that it consists only of partitions 24 secured directly, as by welding, to the bottom of the basket. Obviously the bottom of the basket 10 now forms a grill through which cooking oil may circulate. The partitions 24 may be precisely like the partitions 16, with the same grill-like construction.

Figures 3, 4:
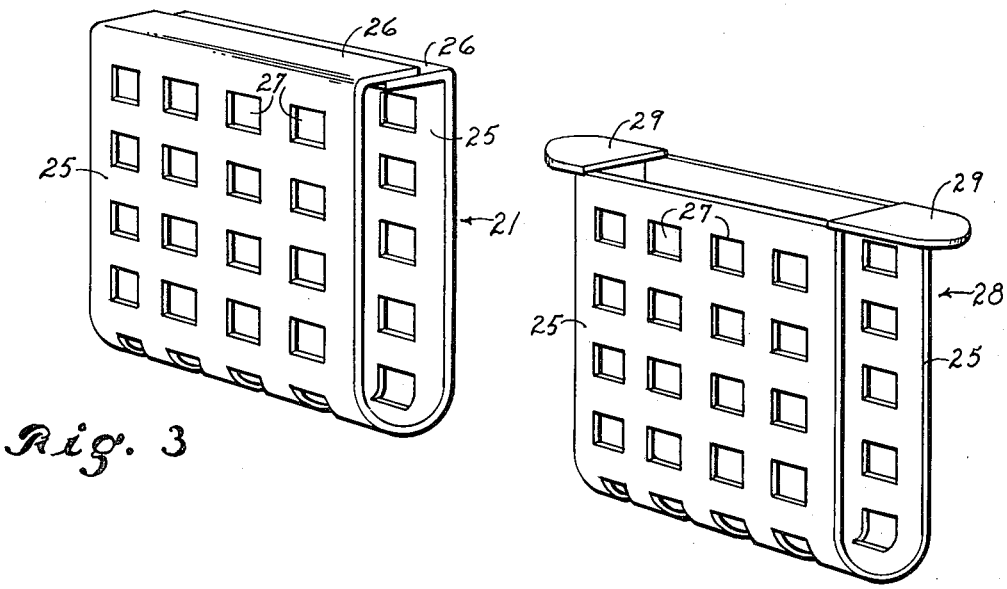
Fig. 3 is a perspective view of a preferred form of core.
Fig. 4 is a perspective view of a modified form of core.

A preferred form of mold core 21 is illustrated in Fig. 3. A strip of perforated sheet material, which may be of the same type as used in making the partitions 15, 16, and 24, is bent to form a narrow U having substantially parallel sides 25 and having inwardly turned flanges 26 which close the open upper end of the U. Holes 27 provide for passage of fluids between the inner and outer surfaces of the core 21.

The modified form of mold core 28, shown in Fig. 4, differs from the core 21 only in the treatment of the top of the core. The core 28 is designed primarily for use in a basket 10 having the fixed frame of partitions 24 shown in Fig. 2, although either of the cores herein illustrated may be used with any of the baskets or frames. To permit the cores 28 to be handily inserted between the fixed partitions 24 and to be removed therefrom without removing the basket from the fry-pot, the cores 28 are provided with tabs 29 which extend endwise from the top of the U and which in operation will extend over the upper edges of the basket to provide fingergrips.

Figure 8:
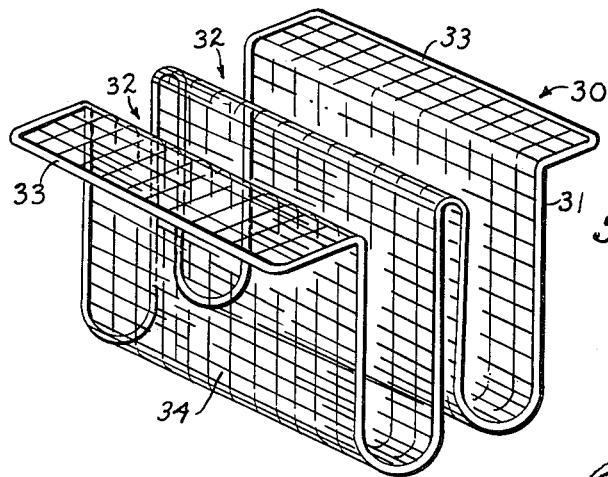
Figs. 8 and 9 are perspective views of further modifications of my invention, in which the fry basket itself serves as the mold frame.
Figure 10:
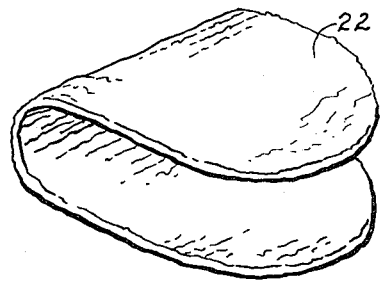
Fig. 10 is a perspective view of a taco shell.
Figure 9:
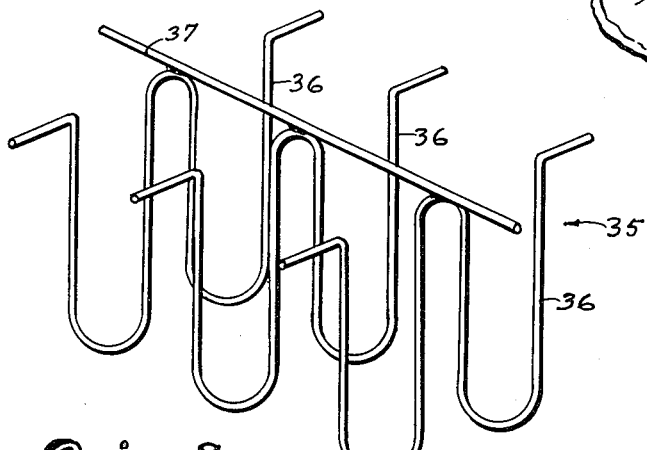

In Figs. 8 and 9 I have shown mold frames suitable for domestic, rather than commercial use, and for occasions when only one or two taco shells are to be prepared. These mold frames combine the functions of baskets and outer molds for frying the tortillas and require only a small pot from which they are separable to leave the pot free for other domestic uses. In the embodiment of the invention shown in Fig. 8, a wire 31 is bent to form two connected U-shaped channels 32 with oppositely extending flanges 33 on the upper outer margins of the channels. This wire frame 30 is then covered with a wire screen 34. The flanges 33 serve to hold the frames suspended on the edges of a fry-pot, and either type of core, 21 or 28, may be used in the channels 32.

Either type of core may also be used in the mold frame 35 illustrated in Fig. 9, in which three wires 36 are bent to the double and flanged U form as the ends of the frame 30. The wires 36 are secured in parallel positions as by welding to a rod 37 which connects their middle loops. While this is an extremely openwork frame, it has the advantage of requiring little metal, affords free circulation of the oil, and still molds and supports the tortilla at three positions. It is characteristic of the frying of a taco shell that the tortilla, as it loses water, tends to contract inwardly to the mold core, and also becomes thinner. The three wires 36 are sufficient to mold and support the tortilla until this contraction and loss of thickness begins, after which it will be found, whichever type of outer mold or basket is used, that the inner cores and the tortillas thereon are merely supported upright, but loosely, in the channels or compartments.

The method of frying a tortilla in my taco shell fryer so as to achieve a perfectly formed shell is deemed to be obvious to any experienced cook. The grill-work on both sides of the tortilla permits the hot oil to have free access to the surfaces of the tortilla, and the general mass of the oil in the fry-pot may circulate freely around the ends of the cores 21 or 28 and through their interior channels. The steam bubbles formed by evaporation of the water content of the tortillas escape through the grill-work of the cores or follow the grill work of the supporting partitions as the tortilla shrinks and leaves ample passage space. It will be found that the steam bubbles in following the grill work to the oil surface are retarded by the grill work and produce less sputter at the surface. The preferred form of core 21, being capped over by the flanges 26, eliminates dangerous sputter over a large portion of the free oil surface. Furthermore, because the steam bubbles tend to coalesce and follow the grill work, there is much less emulsification of the oil, and a filling of oil will last much longer without breakdown. Because the baskets and frames may be suspended above a pot to drain, there is also less wastage of oil than when hand-fried taco shells are removed to a drainboard.

As further modifications of my invention are possible without departure from the spirit of the invention, I desire to have my invention interpreted as including such modification and changes as fall fairly within the scope and spirit of the appended claims.

I claim:

1. Apparatus for frying taco shells comprising a U-shaped core for molding a tortilla placed upon its outer surfaces, and spaced wall means forming a channel opening upwardly when in frying position to receive said core and said tortilla so as to enclose the U-bend of said core and to retain said tortilla in molded form, said core and said wall means having openings for the passage of fluids to and from said tortilla and said core having lifting means connecting the sides of said core so as to hold said sides rigidly spaced.

2. Apparatus for frying taco shells comprising a U-shaped core for molding a tortilla placed upon its outer surfaces, upwardly opening channel-form grill means for receiving said core and tortilla and being operative to retain the tortilla in its molded form prior to shrinking thereof to the core during frying, said core having a plurality of fine openings for the passage of fluids between its inner surfaces and said tortilla, and being further provided with means for lifting said core vertically from said grill means with the rounded end of said core nethermost, said means being secured to the end of said core opposite to said rounded end and holding the walls of said core in fixed spaced relationship so as to prevent said tortilla from distorting said walls while shrinking during frying or being removed from said core.

3. Apparatus for frying taco shells substantially as set forth in claim 2, wherein said lifting means comprises angularly turned and overlapping flange means at the top of the U.

References Cited in the file of this patent

UNITED STATES PATENTS

| | | |
|---|---|---|
| 1,543,221 | Matson | June 23, 1925 |
| 2,506,305 | Maldonado | May 2, 1950 |
| 2,557,467 | Rodiquez | June 19, 1951 |
| 2,570,374 | Pompa | Oct. 9, 1951 |
| 2,664,812 | Molina | Jan. 5, 1954 |